(12) United States Patent
Choe et al.

(10) Patent No.: US 9,001,093 B2
(45) Date of Patent: Apr. 7, 2015

(54) DISPLAY DEVICE AND METHOD OF DRIVING THE SAME

(71) Applicant: Samsung Display Co., Ltd., Yongin, Gyeonggi-Do (KR)

(72) Inventors: Weon-Jun Choe, Seoul (KR); Byung-Hyuk Shin, Seoul (KR); Sang-Soo Kim, Seoul (KR); Min-Kyu Park, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/172,300

(22) Filed: Feb. 4, 2014

(65) Prior Publication Data

US 2014/0184575 A1    Jul. 3, 2014

Related U.S. Application Data

(62) Division of application No. 12/621,990, filed on Nov. 19, 2009, now Pat. No. 8,681,139.

(30) Foreign Application Priority Data

Dec. 15, 2008  (KR) .................. 10-2008-0127328

(51) Int. Cl.
  *G06F 3/038*   (2013.01)
  *G09G 5/00*    (2006.01)
  *G09G 3/20*    (2006.01)
  *H04N 7/01*    (2006.01)

(52) U.S. Cl.
  CPC .. *G09G 5/00* (2013.01); *G09G 3/20* (2013.01); *G09G 2320/0252* (2013.01); *G09G 2320/103* (2013.01); *G09G 2340/0435* (2013.01); *H04N 7/0127* (2013.01); *H04N 7/014* (2013.01)

(58) Field of Classification Search
  None
  See application file for complete search history.

(56) References Cited

U.S. PATENT DOCUMENTS

| 6,002,810 A | 12/1999 | Wakisawa et al. |
| 2005/0196056 A1 | 9/2005 | Lee et al. |
| 2007/0229557 A1* | 10/2007 | Okumura et al. ............ 345/698 |

FOREIGN PATENT DOCUMENTS

| JP | 01240074 A | 9/1989 |
| JP | 02163797 A | 6/1990 |
| JP | 2003069961 A | 3/2003 |
| JP | 2006245722 A | 9/2006 |
| JP | 2008065332 A | 3/2008 |
| KR | 1019960040026 | 11/1996 |
| KR | 1020060099351 A | 9/2006 |
| KR | 100655040 B1 | 11/2006 |
| KR | 1020080000340 A | 1/2008 |
| KR | 100806858 B1 | 2/2008 |

* cited by examiner

*Primary Examiner* — Nicholas Lee
(74) *Attorney, Agent, or Firm* — Cantor Colburn LLP

(57) ABSTRACT

A method of driving a display device includes: sub-sampling an original image signal; generating a sub-image signal; generating a sub-interpolated image signal from the sub-image signal; generating an interpolated frame by realigning the sub-interpolated image signal; and displaying an image having the interpolated frame.

8 Claims, 15 Drawing Sheets

FIG. 9

|  | 1st group | | 2nd group | |
|---|---|---|---|---|
| 1st line | a1' | b1' | a2' | b2' |
| 2nd line | c1' | d1' | c2' | d2' |
| 3rd line | a3' | b3' | a4' | b4' |
| 4th line | c3' | d3' | c4' | d4' |

[interpolated image]

[original image]

[sub_sample image]

[interpolated image]

DISPLAY DEVICE AND METHOD OF DRIVING THE SAME

This application is a divisional of U.S. patent application Ser. No. 12/621,990, filed on Nov. 19, 2009, which claims priority to Korean Patent Application No. 10-2008-0127328, filed on Dec. 15, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device and a method of driving the same, and more particularly, to a display device which is manufactured at a substantially reduced cost and offers substantially improved display quality by outputting a high-speed image signal, and a method of driving the display device.

2. Description of the Related Art

In an effort to improve display quality of display devices, a technology is being developed in which interpolated frames, for which motion of an object has been compensated, are inserted between original frames. Generally, display devices provide image information corresponding to 60 frames per second. However, the abovementioned technology enables display devices to generate image information for interpolated frames, and thereby display an image corresponding to 120 frames per second.

To implement the technology, display devices may include a motion interpolator which outputs a high-speed image signal having interpolated frames. Thus, as a number of the interpolated frames inserted between original frames increases, a display quality of display devices increases. However, an image interpolation chip, which outputs a high-speed image signal having an increased number of interpolated frames, is required to insert the increased number of interpolated frames. In addition, as a resolution of the display devices increases, an amount of data required to be processed by each image interpolation chip also increases. As a result, time and money required to develop the image interpolation chip to output the high-speed image signal and/or process the data substantially increase.

BRIEF SUMMARY OF THE INVENTION

Exemplary embodiments of the present invention provide a display device which is manufactured at a substantially reduced cost and offers substantially improved display quality by outputting a high-speed image signal.

Exemplary embodiments of the present invention also provide a method of driving the display device.

According to an exemplary embodiment, a display device includes: a sub-sampler which sub-samples an original image signal and generates a sub-image signal; a motion interpolator which generates a sub-interpolated image signal from the sub-image signal; an image realigner which realigns the sub-interpolated image signal and outputs an interpolated image signal; and a display panel which displays a display image having an interpolated frame corresponding to the interpolated image signal.

According to another exemplary embodiment, a method of driving a display device includes: sub-sampling an original image signal; generating a sub-image signal; generating a sub-interpolated image signal from the sub-image signal; generating an interpolated image signal by realigning the sub-interpolated image signal; and displaying an image having an interpolated frame based on the interpolated image signal.

According to yet another exemplary embodiment, a method of driving a display device, the display device including a display panel having display blocks each including k groups of pixels, includes: sub-sampling an original image signal, which corresponds to one group of the k groups of pixels included in one of the display blocks; extracting a sub-image signal from the original image signal which is sub-sampled; generating a sub-interpolated image signal from the sub-image signal; generating an interpolated image signal corresponding to unsampled groups of pixels of the k groups of pixels included in the one of the display blocks using the sub-interpolated image signal; generating an interpolated frame based on the interpolated image signal; and displaying a display image having the interpolated frame. The display image is displayed on the display panel, and the sub-sample image includes images, each sampled from k images into which a portion of the display image, displayed on display blocks into which the display panel is divided. In an exemplary embodiment, k is a natural number greater than or equal to two.

BRIEF DESCRIPTION OF THE DRAWINGS

The above and other aspects and advantages of the present invention will become more readily apparent by describing in further detail exemplary embodiments thereof with reference to the accompanying drawings, in which:

FIG. 9 is a diagram which illustrates an interpolated image generated by the process shown in FIG. 8;

DETAILED DESCRIPTION OF THE INVENTION

Figure 1:
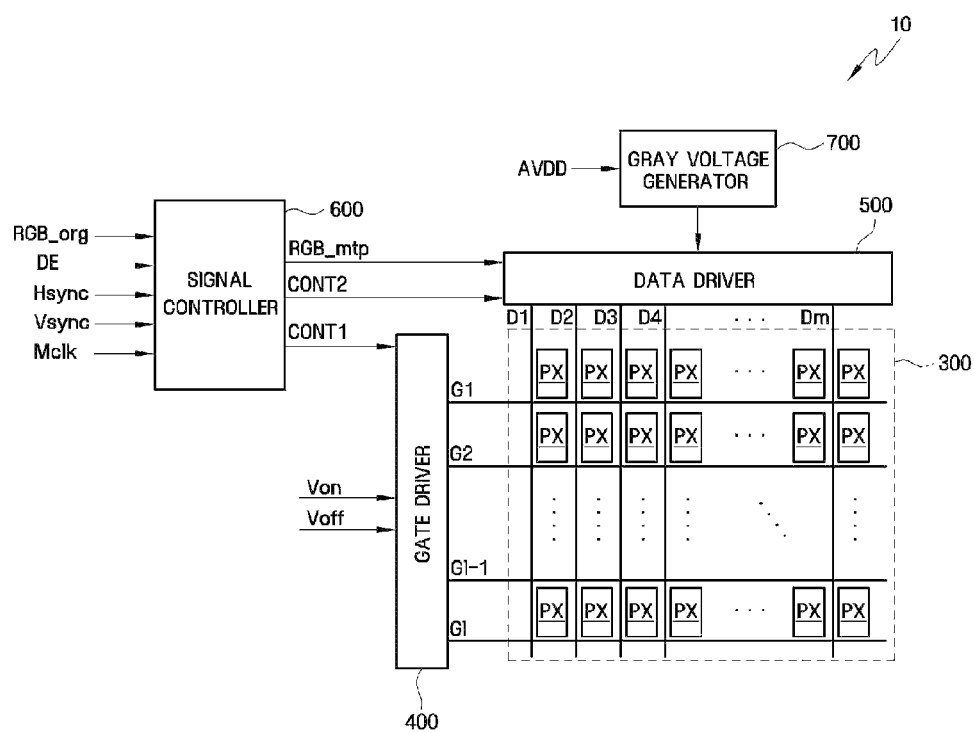
FIG. 1 is a block diagram of an exemplary embodiment of a display device according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, a display device and a method of driving the same according to an exemplary embodiment will be described in further detail with reference to FIGS. 1 through 9.

Figure 2:
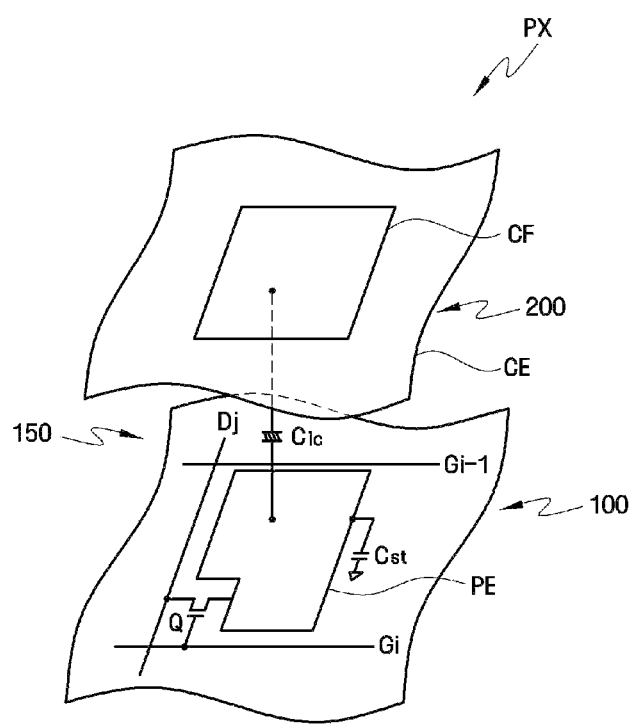
FIG. 2 is an equivalent schematic circuit diagram of an exemplary embodiment of a pixel included in a display panel of the display device shown in FIG. 1.

FIG. 1 is a block diagram of an exemplary embodiment of a display device 10 according to the present invention. FIG. 2 is an equivalent schematic circuit diagram of a pixel PX included in a display panel 300 of the display device 10 shown in FIG. 1.

Referring to FIG. 1, the display device 10 according to an exemplary embodiment includes the display panel 300, a signal controller 600, a gate driver 400, a data driver 500 and a gray voltage generator 700.

The display panel 300 includes gate lines G1 through Gl, data lines D1 through Dm and pixels PX arranged in a substantially matrix pattern, as shown in FIG. 1. The gate lines G1 through Gl extend in a substantially row direction and are substantially parallel to each other, while the data lines D1 through Dm extend in a substantially column direction, substantially parallel to each other. In an exemplary embodiment, the pixels PX are defined in regions at which the gate lines G1 through Gl cross the data lines D1 through Dm. The gate driver 400 transmits gate signals to the gate lines G1 through Gl, and the data driver 500 transmits image data voltages to the data lines D1 through Dm. The pixels PX display a desired image, e.g., a display image, in response to the image data voltages.

As will be described in greater detail below, the signal controller 600 outputs a high-speed image signal RGB_mtp to the data driver 500, and the data driver 500 outputs image data voltages corresponding to the high-speed image signal RGB_mtp. The pixels PX of the display panel 300 display the display image in response to the image data voltages, and the pixels PX therefore display a high-speed image corresponding to the high-speed image signal RGB_mtp.

The display panel 300 according to an exemplary embodiment is divided into display blocks, each including a plurality of the pixels PX. In an exemplary embodiment, each display block includes k groups of pixels (where "k" is a natural number greater than or equal to two). The display blocks, and groups of pixels included therein, will be described in further detail below with reference to FIGS. 5, 9 and 13.

Referring to the equivalent schematic circuit diagram of FIG. 2, each of the pixels PX is connected to an $i^{th}$ (where i=1 to l) gate line Gi and a $j^{th}$ (where j=1 to m) data line Dj. In addition, each of the pixels PX includes a switching device Q, connected to the $i^{th}$ gate line Gi and the $j^{th}$ data line Dj, and a liquid crystal capacitor Clc and a storage capacitor Cst connected to the switching device Q. The liquid crystal capacitor Clc includes two electrodes (e.g., a pixel electrode PE disposed on a first substrate 100 and a common electrode CE disposed on a second substrate 200) and liquid crystal molecules 150 interposed between the pixel electrode PE and the common electrode CE. A color filter CF may be disposed proximate to the common electrode CE, as shown in FIG. 2.

Referring again to FIG. 1, the signal controller 600 receives an original image signal RGB_org and external control signals (such as a data enable signal DE, a horizontal synchronization signal Hsync, a vertical synchronization signal Vsync, and a main clock signal Mclk) for controlling the display of the original image signal RGB_org, and outputs the high-speed image signal RGB_mtp, gate control signals CONT1 and data control signals CONT2. In an exemplary embodiment, a frequency of the high-speed image signal RGB_mtp is greater than a frequency of the original image signal RGB_org. Hereinafter, the phrase "frequency of the high-speed image signal RGB_mtp" denotes a frame frequency at which the high-speed image signal RGB_mtp is displayed on the display device 10, and the phrase "frequency of the original image signal RGB_org" denotes a frequency at which the original image signal RGB_org is displayed on thereon. In an exemplary embodiment, for example, the original image signal RGB_org may have a frequency of 60 Hz, and the high-speed image signal RGB_mtp may have a frequency of 120 Hz, but alternative exemplary embodiments are not limited thereto.

Still referring to FIG. 1, the signal controller 600 receives the original image signal RGB_org and outputs the high-speed image signal RGB_mtp. The signal controller 600 may also receive the external control signals from an external source (not shown) and generate the gate control signals CONT1 and the data control signals CONT2. The external control signals include, for example, the vertical synchronization signal Vsync, the horizontal synchronization signal Hsync, the main clock signal Mclk and the data enable signal DE. The gate control signals CONT1 control an operation of the gate driver 400, and the data control signals CONT2 control an operation of the data driver 500. The signal controller 600 will be described in further detail below with reference to FIG. 3.

The gate driver 400 receives the gate control signals CONT1 from the signal controller 600 and transmits gate signals to the gate lines G1 through Gl. In an exemplary embodiment, the gate signals may include a gate-on voltage Von and a gate-off voltage Voff provided by a gate on/off voltage generator (not shown).

The data driver 500 receives the data control signals CONT2 from the signal controller 600 and applies the image data voltages, which correspond to the high-speed image signal RGB_mtp, to the data lines D1 through Dm. The image data voltages corresponding to the high-speed image signal RGB_mtp are provided by the gray voltage generator 700.

The gray voltage generator 700 divides a driving voltage AVDD into image data voltages having gray levels based on the gray level of the high-speed image signal RGB_mtp and provides the image data voltages to the data driver 500. The gray voltage generator 700 may include resistors connected in electrical series with each other between nodes, to which the driving voltage AVDD is applied, and a ground source, for example. Thus, the gray voltage generator 700 divides the driving voltage AVDD and thereby generates a plurality of gray voltages, but alternative exemplary embodiments of the gray voltage generator 700 are not limited to the foregoing description.

Figure 3:
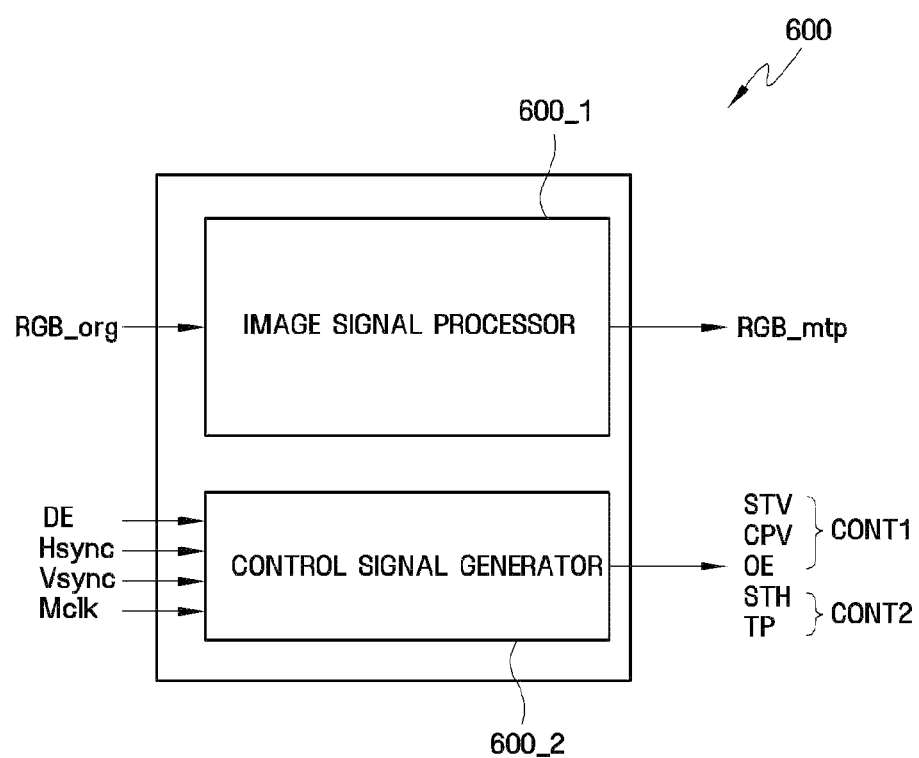
FIG. 3 is a block diagram of an exemplary embodiment of a signal controller of the display device shown in FIG. 1.

FIG. 3 is a block diagram of an exemplary embodiment of the signal controller 600 of the display device 10 shown in FIG. 1. Referring to FIG. 3, the signal controller 600 according to an exemplary embodiment includes an image signal processor 600_1 and a control signal generator 600_2.

To substantially improve a display quality of the display device 10 according to an exemplary embodiment, the image signal processor 600_1 inserts interpolated frames, in which motion of an object OBJ (FIG. 7) has been compensated, between original frames, and outputs the original frames having the interpolated frames inserted therebetween. More specifically, the image signal controller 600_1 receives the original image signal RGB_org and outputs the high-speed image signal RGB_mtp, as show in FIG. 3. The image signal processor 600_1 will be described in greater detail below with reference to FIG. 4.

The control signal generator 600_2 receive the external control signals (such as the data enable signal DE, the horizontal synchronization signal Hsync, the vertical synchronization signal Vsync and the main clock signal Mclk, for example) from the external source (not shown) and generates the gate control signals CONT1 and the data control signals CONT2.

The gate control signals CONT1 to control the operation of the gate driver 400. The gate control signals CONT1 may include, for example, a vertical start signal STV for starting the gate driver 400, a gate clock signal CPV for determining when to output the gate-on voltage Von and an output enable signal OE for determining a pulse width of the gate-on voltage Von. The data control signals CONT2 control the operation of the data driver 500. The data control signals CONT2 may include, for example, a horizontal start signal STH for starting the data driver 500 and an output instruction signal TP for instructing output of the image data voltage.

Figure 4:
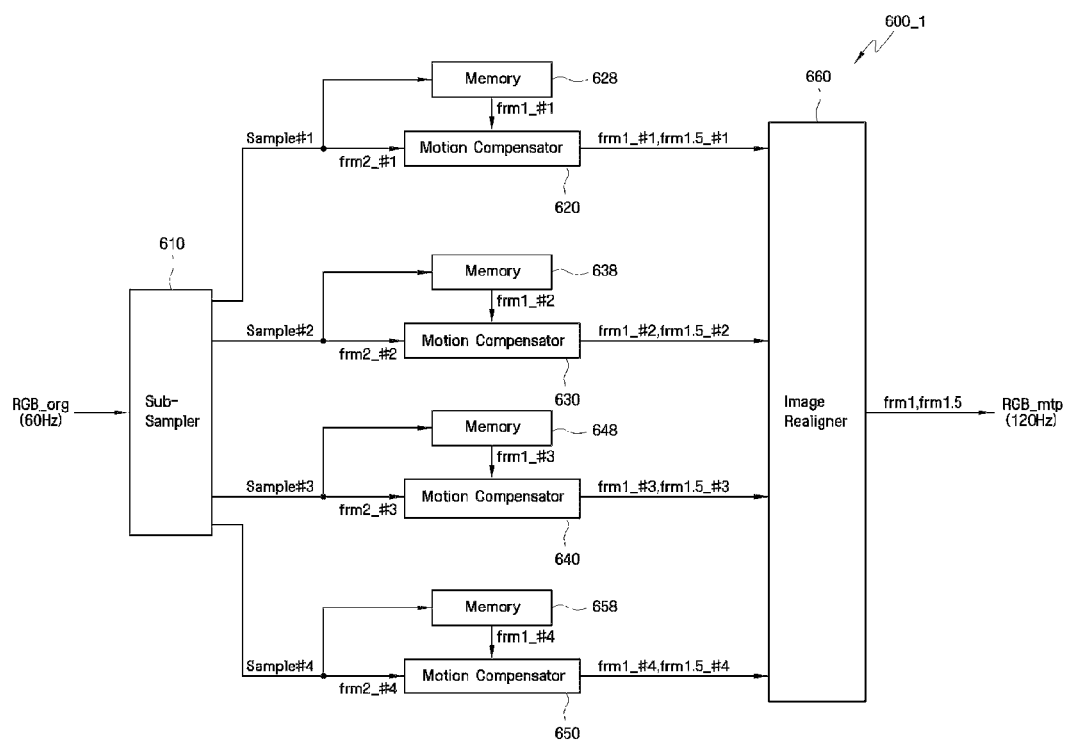
FIG. 4 is a block diagram of an exemplary embodiment of an image signal processor in the signal controller shown in FIG. 3.
Figure 5:
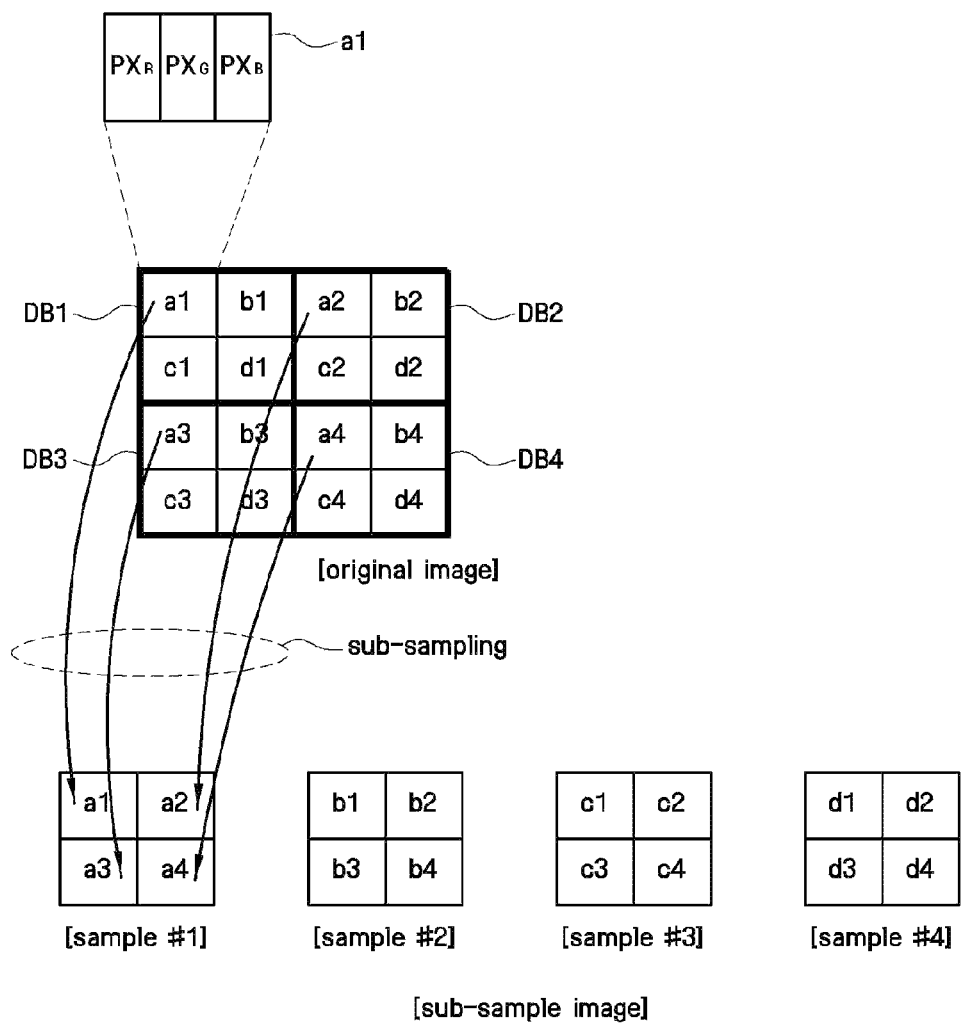
FIG. 5 is a diagram for explaining sub-sampling performed by an exemplary embodiment of a sub-sampler of the image signal processor shown in FIG. 4.

FIG. 4 is a block diagram of an exemplary embodiment of the image signal processor 600_1 of the display device 10 shown in FIG. 3, and FIG. 5 is a diagram for explaining sub-sampling performed by an exemplary embodiment of a sub-sampler of the image signal processor shown in FIG. 4. Hereinafter, a previous frame of the original image signal RGB_org is indicated by reference character "frm1", a current frame of the original image signal RGB is indicated by reference character "frm2", and an interpolated frame, such as a ½ interpolated frame, for example, inserted between the previous frame frm1 and the current frame frm2 is indicated by reference character "frm1.5."

Referring to FIGS. 4 and 5, the image signal processor 600_1 sub-samples the original image signal RGB_org to generate first through fourth sub-image signals Sample#1 through Sample#4, respectively. The image signal processor 600_1 generates sub-interpolated image signals, which correspond to sub-interpolated frames frm1.5_#1 through frm1.5_#4 from the first through fourth sub-image signals Sample#1 through Sample#4, respectively. The image signal processor 600_1 realigns the sub-interpolated image signals and outputs an interpolated image signal corresponding to the ½ interpolated frame frm1.5. As a result, the image signal processor 600_1 according to an exemplary embodiment outputs the high-speed image signal RGB_mtp having the ½ interpolated frame frm1.5 inserted between the previous frame frm1 and the current frame frm2.

Referring to FIG. 4, the image signal processor 600_1 includes a sub-sampler 610, a motion interpolator (including a first motion compensator 620, a second motion compensator 630, a third motion compensator 640 and a fourth motion compensator 650), a first memory 628, a second memory 638, a third memory 648 and a fourth memory 658, and an image realigner 660.

The sub-sampler 610 sub-samples the original image signal RGB_org and outputs k sub-image signals, e.g., the first through fourth sub-image signals Sample#1 through Sample#4, respectively, into which the original image signal RGB_org, corresponding to an image frame, is divided. The first through fourth sub-image signals Sample#1 through Sample#4, respectively, correspond to sub-sample images corresponding to the display blocks, each including a group, e.g., a plurality of, the pixels PX (FIG. 1), as will be described in further detail below with reference to FIG. 5. As noted above, "k" is a natural number equal to or greater than two. Thus, in an exemplary embodiment shown in FIG. 4, the original image signal RGB_org, corresponding to an image frame, is divided into four segments (e.g., k=4). In this case, the first through fourth sub-image signals Sample#1 through Sample#4, respectively, correspond to the four segments. Sub-sampling the original image signal RGB_org will be described in greater detail below with reference to FIG. 5.

Referring still to FIG. 4, the motion interpolator generates the sub-interpolated image signals which correspond to the sub-interpolated frames frm1.5_#1 through frm1.5_#4 using the first through fourth sub-image signals Sample#1 through Sample#4, respectively.

The motion interpolator may include k motion compensators, e.g., the first motion compensator 620, the second motion compensator 630, the third motion compensator 640 and the fourth motion compensator 650 (when k is equal to four). The first motion compensator 620, the second motion compensator 630, the third motion compensator 640 and the fourth motion compensator 650 (hereinafter referred to as "image interpolation chips") receive sub-image signals corresponding to the current frame frm2 and the previous frame frm1. More specifically, the first motion compensator 620, the second motion compensator 630, the third motion compensator 640 and the fourth motion compensator 650 receive sub-image signals which correspond to sub-sample images frm2_#1 through frm2_#4 of the current frame frm2 from the sub-sampler 610, and read sub-image signals which correspond to sub-sample images frm1_#1 through frm1_#4 of the previous frame frm1 from memories, e.g., the first memory 628, the second memory 638, the third memory 648 and the fourth memory 658, respectively.

The first motion compensator 620, the second motion compensator 630, the third motion compensator 640 and the fourth motion compensator 650 receive a corresponding one of the first through fourth sub-image signals Sample#1 through Sample#4, respectively, which correspond to 60 frames. Then, each of the first motion compensator 620, the second motion compensator 630, the third motion compensator 640 and the fourth motion compensator 650 generates and outputs the sub-interpolated image signal corresponding to the sub-interpolated frame frm1.5_#1, frm1.5_#2, frm1.5_#3, or frm1.5_#4 which is inserted between the current frame frm2 and the previous frame frm1 of the corresponding one of the first through fourth sub-image signals Sample#1 through Sample#4, respectively.

In an exemplary embodiment, for example, the first motion compensator 620 generates a sub-interpolated image signal corresponding to the sub-interpolated frame frm1.5_#1 from a sub-image signal corresponding to the sub-sample image frm2_#1 of the current frame frm2 and a sub-image signal corresponding to the sub-sample image frm1_#1 of the previous frame frm1. Then, the first motion compensator 620 outputs the sub-interpolated image signal corresponding to the sub-interpolated frame frm1.5_#1 and the sub-image signal corresponding to the sub-sample image frm1_#1 of the previous frame frm1. The above-described operation of the first motion compensator 620 is applied in substantially the same manner to the second the second motion compensator 630, the third motion compensator 640 and the fourth motion compensator 650. Moreover, generating a sub-interpolated image signal will be described in further detail below with reference to FIGS. 6 and 7.

The image realigner 660 realigns the sub-interpolated image signals corresponding to the generated sub-interpolated frames frm1.5_#1 through frm1.5_#4 and outputs the interpolated image signal corresponding to the interpolated frame frm1.5. The image realigner 660 also realigns the sub-image signals corresponding to the sub-sample images frm1_#1 through frm1_#4 of the previous frame frm1 and outputs an image signal corresponding to the previous frame frm1.

Thus, in an exemplary embodiment, the image realigner 660 realigns image signals output from the first motion compensator 620, the second motion compensator 630, the third motion compensator 640 and the fourth motion compensator 650, and generates a high-speed, e.g., a double-("2×")-speed, image signal RGB_mtp having the ½ interpolated frame frm1.5 inserted between the previous frame frm1 and the current frame frm2. As a result, a 120 Hz image signal, including 120 frames, is outputted and displayed on the display device 10 according to an exemplary embodiment. Realigning image signals output from the first motion compensator 620, the second motion compensator 630, the third motion compensator 640 and the fourth motion compensator 650 and outputting the high-speed image signal will be described in greater detail below with reference to FIGS. 8 and 9.

Sub-sampling will now be described in greater detail with reference to FIGS. 4 and 5. FIG. 5 is a diagram for explaining sub-sampling performed by an exemplary embodiment of the sub-sampler 610 shown in FIG. 4.

In FIG. 5, each square ("a1," for example) indicates a group of the pixels PX (FIG. 1), and the groups of pixels PX are arranged in display blocks included in the display panel 300. In addition, reference characters "a1" through "d4" in each square of FIG. 5 denote original image signals RGB_org corresponding to a display image displayed on each of the groups of pixels PX. Thus, in FIG. 5, for example, a display panel according to an exemplary embodiment includes 16 groups of pixels PX arranged in a 4×4 matrix is illustrated, but alternative exemplary embodiments are not limited thereto. In an exemplary embodiment, each group of pixels PX may include a red pixel $PX_R$, a green pixel $PX_G$ and a blue pixel $PX_B$, as shown in FIG. 5.

The display panel 300 according to an exemplary embodiment includes a plurality of the display blocks, each having k groups of pixels (where k is a natural number equal to or greater than two). In FIG. 5, for example, four display blocks, each having four groups of pixels (e.g., k=4), are illustrated. In each of the four display blocks, one of an image including the original image signals a1 through d1, an image including the original image signals a2 through d2, an image including the original image signals a3 through d3, or an image including the original image signals a4 through d4 is displayed, depending upon the display block. More specifically, as shown in FIG. 5, a first display block DB1 corresponds to original image signals a1, b1, c1 and d1, while a second display block DB2 corresponds to original image signals a2, b2, c2 and d2. Likewise, a third display block DB3 corresponds to original image signals a3, b3, c3 and d3, while a fourth display block DB4 corresponds to original image signals a4, b4, c4 and d4.

To sub-sample the original image signals a1 through d4 corresponding to the original image signal, a group of pixels PX is selected from each of the display blocks DB1 through DB4 based on a specified rule, and original image signals corresponding to each of the selected groups of pixels PX is sampled. More specifically, as shown in FIG. 5, a group of pixels PX at a top left corner of each display block may be selected. Accordingly, the original image signals a1, a2, a3 and a4, corresponding to the selected groups of pixels PX from the first display block DB1, the second display block DB2, the third display block DB3 and the fourth display block Db4, respectively, may be sampled to extract the first sub-image signal Sample#1. Thus, a resolution of the first sub-image signal Sample#1 is one-fourth a resolution of the original image.

Next, a group of pixels PX at a top right corner (as viewed in FIG. 5) of each of the display blocks DB1 through DB4 may be selected. Accordingly, the original image signals b1 through b4 corresponding to the selected groups pixels PX may be sampled to extract the second sub-image signal Sample#2. Likewise, the original image signals c1 through c4 may be sampled to extract the third sub-image signal Sample#3, and the original image signals d1 through d4 may be sampled to extract the fourth sub-image signal Sample#4. Thus, each sub-sample image may be a combination of images, each selected from k images into which an original image displayed in each display block is divided.

Figure 6:
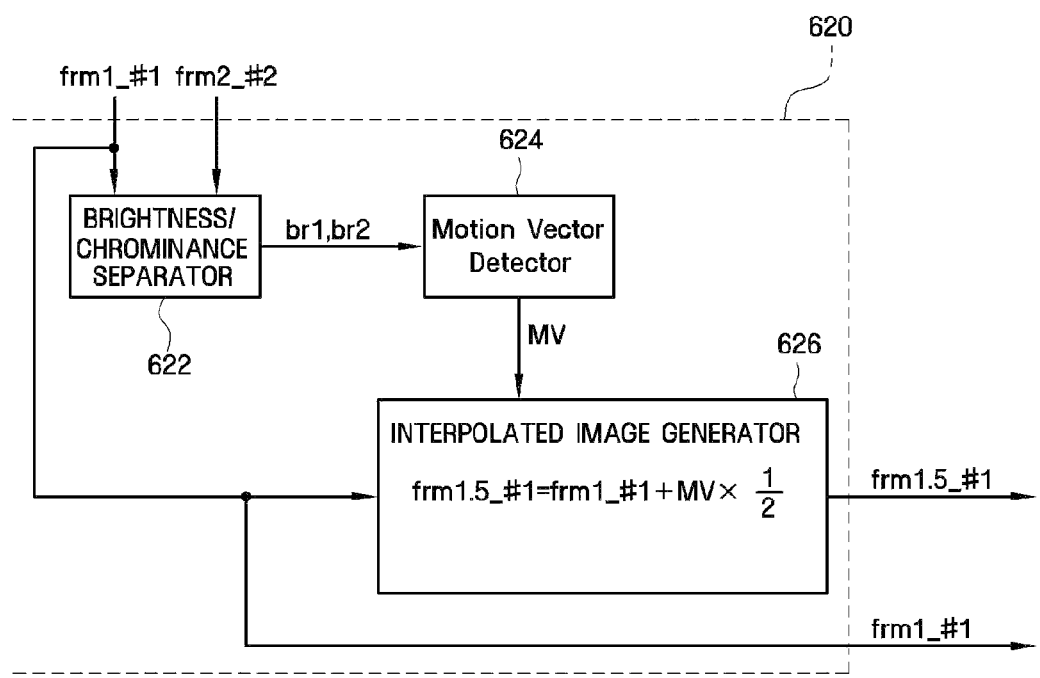
FIG. 6 is a block diagram of an exemplary embodiment of a motion compensator of the image signal processor shown in FIG. 4.

FIG. 6 is a block diagram of an exemplary embodiment of one of the first motion compensator 620, the second motion compensator 630, the third motion compensator 640 and the fourth motion compensator 650 of the image signal processor shown in FIG. 4. It will be noted that, while the first motion compensator 620 will be described in greater detail with reference to FIG. 6, descriptions thereof also applied substantially the same to the second motion compensator 630, the third motion compensator 640 and the fourth motion compensator 650.

Referring to FIG. 6, the first motion compensator 620 calculates a motion vector MV of the object OBJ by comparing the sub-sample image frm1_#1 of the previous frame frm1 with the sub-sample image frm2_#1 of the current frame frm2 and outputs the sub-interpolated image signal corresponding to the sub-interpolated frame frm1.5_#1 by using the calculated motion vector MV.

As illustrated in FIG. 6, the first motion compensator 620 includes a brightness/chrominance separator 622, a motion vector detector 624 and an interpolated image generator 626.

The brightness/chrominance separator 622 separates the sub-image signal corresponding to the sub-sample image frm1_#1 of the previous frame frm1 into brightness components br1 and br2 and a chrominance component (not shown). In an exemplary embodiment, the brightness components br1 and br2 of an image signal include brightness information, and the chrominance component thereof includes chrominance information, e.g., color information.

The motion vector detector 624 calculates the motion vector MV of the object OBJ by comparing the sub-sample image frm1_#1 of the previous frame frm1 with the sub-sample image frm2_#1 of the current frame frm2. For example, the motion vector detector 624 may receive the brightness component br1 of the sub-sample image frm1_#1 of the previous frame frm1 and the brightness component br2 of the sub-sample image frm2_#1 of the current frame frm2 and calculate the motion vector MV of the object OBJ. In an exemplary embodiment, the motion vector MV is a physical quantity which represents motion of the object OBJ included in a display image.

Still referring to FIG. 6, the motion vector detector 624 may analyze the brightness component br1 of the sub-sample image frm1_#1 of the previous frame frm1 and the brightness component br2 of the sub-sample image frm2_#1 of the current frame frm2 and thereby determine that the object OBJ is displayed in respective regions of the previous frame frm1 and the current frame frm2 which have corresponding brightness distributions. Based on the motion of the object OBJ from the sub-sample image frm1_#1 of the previous frame frm1 to the sub-sample image frm2_#1 of the current frame frm2, the motion vector detector 624 extracts the motion vector MV of the object OBJ, as will be described in greater detail below with reference to FIG. 7.

The interpolated image generator 626 calculates a position of the object OBJ in the sub-interpolated frame frm1.5_#1 using the motion vector MV calculated by the motion vector detector 624. In an exemplary embodiment, for example, the interpolated image generator 626 may assign a weight of ½ to the motion vector MV and generate a sub-interpolated image signal corresponding to the ½ interpolated frame frm1.5_#1.

Figure 7:
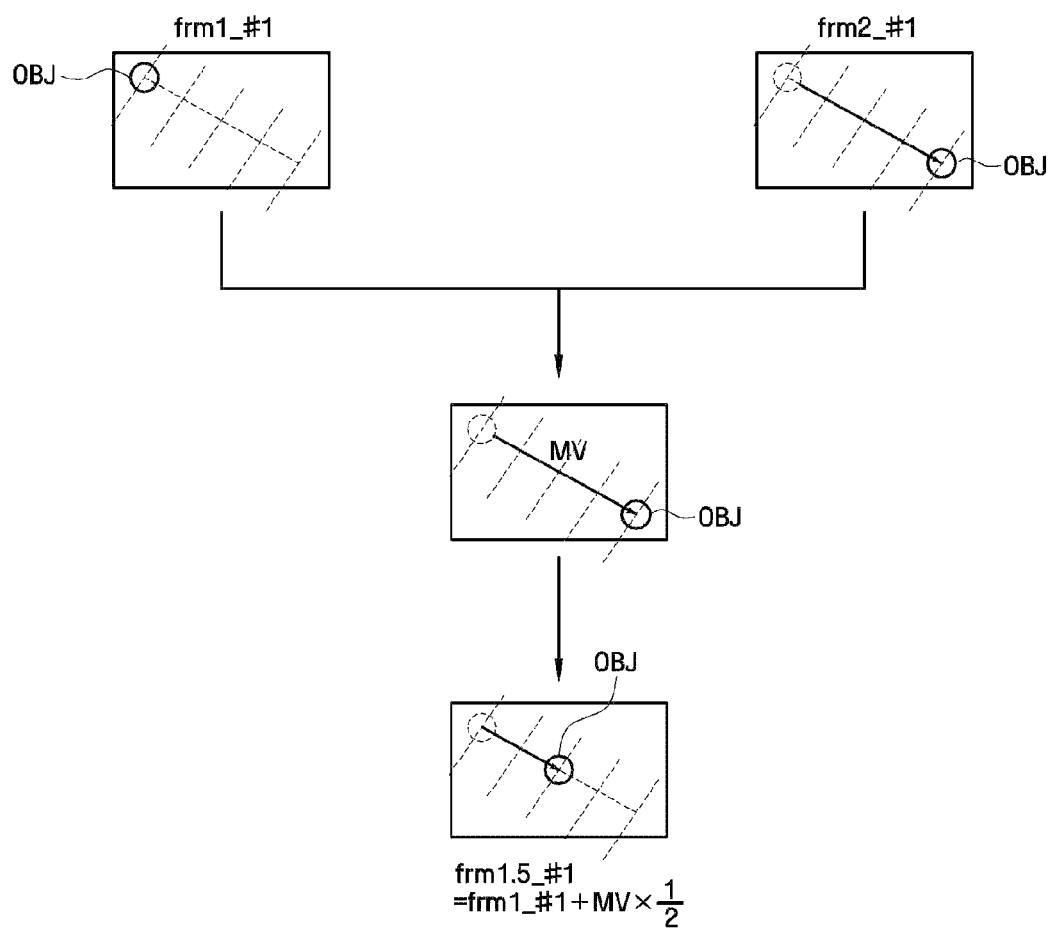
FIG. 7 is a diagram for explaining a process of calculating a motion vector and generating a sub-interpolated frame in the display device shown in FIG. 1.

FIG. 7 is a diagram for explaining a process of calculating the motion vector MV and generating a sub-interpolated frame in the display device 10 according to an exemplary embodiment. The process in which the first motion compensator 620 calculates the motion vector MV and generates the sub-interpolated frame frm1.5_#1 by using the calculated motion vector MV will now be described in further detail with reference to FIG. 7. It will be noted that, while the first motion compensator 620 will hereinafter be described, the description of the first motion compensator 620 may also be applied in substantially the same manner to the second motion compensator 630, the third motion compensator 640 and the fourth motion compensator 650.

Referring now to FIGS. 6 and 7, the first motion compensator 620 detects the object OBJ by comparing the sub-image signal corresponding to the sub-sample image frm2_#1 of the current frame frm2 with the sub-image signal corresponding to the sub-sample image frm1_#1 of the previous frame frm1. To detect the object OBJ in the previous frame frm1 and the current frame frm2, a sum of absolute difference ("SAD") method may be used.

In FIG. 7, the object OBJ, which may be a circular object OBJ, is detected as a same object OBJ in the sub-sample image frm2_#1 of the current frame frm2 and the sub-sample image frm1_#1 of the previous frame frm1. The motion vector MV (indicated by an arrow in FIG. 7) of the circular object OBJ is calculated based on motion of the circular object OBJ from the sub-sample image frm1_#1 of the previous frame frm1 to the sub-sample image frm2_#1 of the current frame frm2. A weight of ½ is assigned to the calculated motion vector MV to generate a sub-interpolated image signal corresponding to the ½ sub-interpolated frame frm1.5_#1. More particularly, the sub-interpolated image signal corresponding to the ½ sub-interpolated frame frm1.5_#1 is generated by adding the motion vector MV, having been assigned a weight of ½, to the sub-sample image frm1_#1 of the previous frame frm1.

Figure 8:
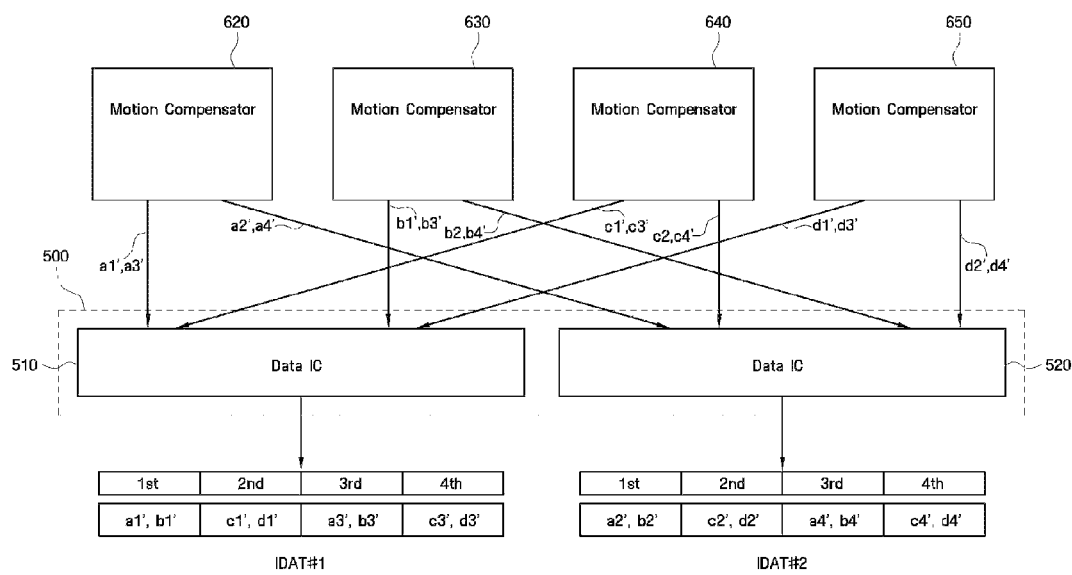
FIG. 8 is a block diagram which illustrates a process in which an exemplary embodiment of an image realigner of the image signal processor shown in FIG. 4 outputs an interpolated image signal corresponding to an interpolated frame by using sub-interpolated image signals corresponding to sub-interpolated frames.

FIG. 8 is a block diagram which illustrates a process in which the image realigner 660 of the image signal processor shown in FIG. 4 outputs an interpolated image signal corresponding to an interpolated frame by using sub-interpolated image signals corresponding to sub-interpolated frames. FIG. 9 is a diagram which illustrates an interpolated image generated by the process shown FIG. 8.

Referring to FIGS. 4, 5 and 8, the first motion compensator 620 receives the original image signals a1 through a4, which form the first sub-image signal Sample#1, as described in greater detail above with reference to FIGS. 4 and 5, and outputs sub-interpolated image signals a1' through a4' which form a first sub-interpolated frame. Likewise, the second motion compensator 630 receives the original image signals b1 through b4, which form the second sub-image signal Sample#2, and outputs sub-interpolated image signals b1' through b4' which form a second sub-interpolated frame. The third motion compensator 640 receives the original image signals c1 through c4 which form the third sub-image signal Sample#3 and outputs sub-interpolated image signals c1' through c4' which form a third sub-interpolated frame. The fourth motion compensator 650 receives the original image signals d1 through d4 which form the fourth sub-image signal Sample#4 and outputs sub-interpolated image signals d1' through d4' which form a fourth sub-interpolated frame.

The data driver 500 (FIG. 1) according to an exemplary embodiment includes a first data integrated circuit ("IC") 510 and a second data IC 520. In addition, the pixels PX included in the display panel 300 of FIG. 1, groups of which are included in each of the display blocks DB1 through DB4, described above, are divided into parts, e.g., blocks. For example, the display panel 300 according to an exemplary embodiment shown in FIG. 1 may be divided into a left part and a right part. Thus, the pixels PX of the display panel 300 may be divided into a first block of pixels PX, included in the left part, and a second block of pixels PX, included in the right part. The first data IC 510 and the second data IC 520 of the data driver 500 apply an image data voltage IDAT#1 and IDAT#2, respectively, to the pixels PX included in the first block and the second block, respectively, but alternative exemplary embodiments are not limited thereto. In an exemplary embodiment, for example, the first data IC 510 may apply the image data voltage IDAT#1 to the pixels PX included in the first block, and the second data IC 520 may apply the image data voltage IDAT#2 to the pixels PX included in the second block, while in an alternative exemplary embodiment, the first data IC 510 may apply the image data voltage IDAT#2 to the pixels PX included in the first block, and the second data IC 520 may apply the image data voltage IDAT#1 to the pixels PX included in the second block.

The image realigner 660 (FIG. 4) outputs an interpolated image signal corresponding to an interpolated frame by using sub-interpolated image signals corresponding to sub-interpolated frames. For example, the image realigner 660 may include a communication line or lines between each of the first motion compensator 620, the second motion compensator 630, the third motion compensator 640 and the fourth motion compensator 650 and the data driver 500.

More specifically, the communication lines may be installed such that a1' and a3' from among the sub-interpolated image signals a1' through a4', outputted from the first motion compensator 620, b1' and b3' from among the sub-interpolated image signals b1' through b4', outputted from the second motion compensator 630, c1' and c3' from among the sub-interpolated image signals c1' through c4', outputted from the third motion compensator 640, d1' and d3' from among the sub-interpolated image signals d1' through d4' outputted from the fourth motion compensator 650 are provided to the first data IC 510, as shown in FIG. 8. In addition, the communication lines may be installed such that a2' and a4' from among the sub-interpolated image signals a1' through a4', outputted from the first motion compensator 620, b2' and b4' from among the sub-interpolated image signals b1' through b4', outputted from the second motion compensator 630, c2' and c4' from among the sub-interpolated image signals c1' through c4', outputted from the third motion compensator 640, d2' and d4' from among the sub-interpolated image signals d1' through d4', outputted from the fourth motion compensator 650 are provided to the second data IC 520.

More particularly and still referring to FIG. 8, the image realigner 660 may output the sub-interpolated image signals to the first data IC 510 and the second data IC 520 in the following order. The sub-interpolated image signals may be provided to the first data IC 510 in order of a1' and b1' in a first section, c1' and d1' in a second section, a3' and b3' in a third section and c3' and d3' in a fourth section. The sub-interpolated image signals may be provided to the second data IC 520 in order of a2' and b2' in the first section, c2' and d2' in the second section, a4' and b4' in the third section, and c4' and d4' in the fourth section.

Referring now to FIGS. 8 and 9, the first data IC 510 provides the pixels PX included in the first block of the display panel 300 with an image data voltage corresponding to a1' and b1' in the first section, an image data voltage corresponding to c1' and d1' in the second section, an image data voltage corresponding to a3' and b3' in the third section, and an image data voltage corresponding to c3' and d3' in the fourth section. The second data IC 520 provides the pixels PX included in the second block of the display panel 300 with an image data voltage corresponding to a2' and b2' in the first section, an image data voltage corresponding to c2' and d2' in the second section, an image data voltage corresponding to a4' and b4' in the third section, and an image data voltage corresponding to c4' and d4' in the fourth section.

Accordingly, the sub-interpolated image signals output from the first motion compensator 620, the second motion compensator 630, the third motion compensator 640 and the fourth motion compensator 650 (FIG. 4) are realigned and outputted as an interpolated image signal and displayed on the display panel 300.

More particularly, an interpolated image displayed on the display panel 300 as described above process is illustrated in FIG. 9. As in FIG. 5, FIG. 9 illustrates an exemplary embodiment of a display panel 300 having 16 groups of pixels PX arranged in a 4×4 matrix, but alternative exemplary embodiments are not limited thereto. Likewise, a first block of the display panel 300 illustrated in FIG. 9 includes groups of pixels PX in first and second columns, and a second block of the display panel includes groups of pixels in third and fourth columns. In addition, the first section corresponds to a period of time during which pixels PX in a first line are turned on, the second section corresponds to a period of time during which pixels PX in a second line are turned on, the third section corresponds to a period of time during which pixels PX in a third line are turned on and the fourth section corresponds to a period of time during which pixels PX in a fourth line are turned on.

Thus, in the display device 10 and the method of driving the same according to an exemplary embodiment, a high-speed image is outputted using the first motion compensator 620, the second motion compensator 630, the third motion compensator 640 and the fourth motion compensator 650, each capable of processing an image signal corresponding to an image having a resolution equal to 1/$k^{th}$ of a resolution of the display panel 300. Specifically, as described in further detail above, each sub-sample image includes a combination of images, each selected from k images into which an original image displayed on each display block is divided. Therefore, each sub-sample image has data which is 1/$k^{th}$ of the data of an original image signal RGB_org corresponding to the original image.

Moreover, a sub-image signal corresponding to each sub-sample image is inputted to each of the first motion compensator 620, the second motion compensator 630, the third motion compensator 640 and the fourth motion compensator 650. Thus, each of the first motion compensator 620, the second motion compensator 630, the third motion compensator 640 and the fourth motion compensator 650 is only required to process an image signal corresponding to an image whose resolution is 1/$k^{th}$ of the resolution of the display panel 300. Further, since a high-speed image is outputted by the first motion compensator 620, the second motion compensator 630, the third motion compensator 640 and the fourth motion compensator 650, each capable of processing data which is 1/$k^{th}$ of that of an original image signal RGB_org, a display quality of the display device 10 according to an exemplary embodiment is substantially improved, and manufacturing costs thereof are substantially reduced.

According to an exemplary embodiment, the first motion compensator 620, the second motion compensator 630, the third motion compensator 640 and the fourth motion compensator 650 do not need to share motion information of the object OBJ with each other, since each of the first motion compensator 620, the second motion compensator 630, the third motion compensator 640 and the fourth motion compensator 650 generates a sub-interpolated image signal corresponding to a sub-interpolated frame by using a sub-image signal which is input thereto and corresponds to a sub-sample image. For this reason, the first motion compensator 620, the second motion compensator 630, the third motion compensator 640 and the fourth motion compensator 650 do not need a way to share information, such as a communication port, thereby further reducing the manufacturing costs of the display device 10 according to an exemplary embodiment.

Figure 10:
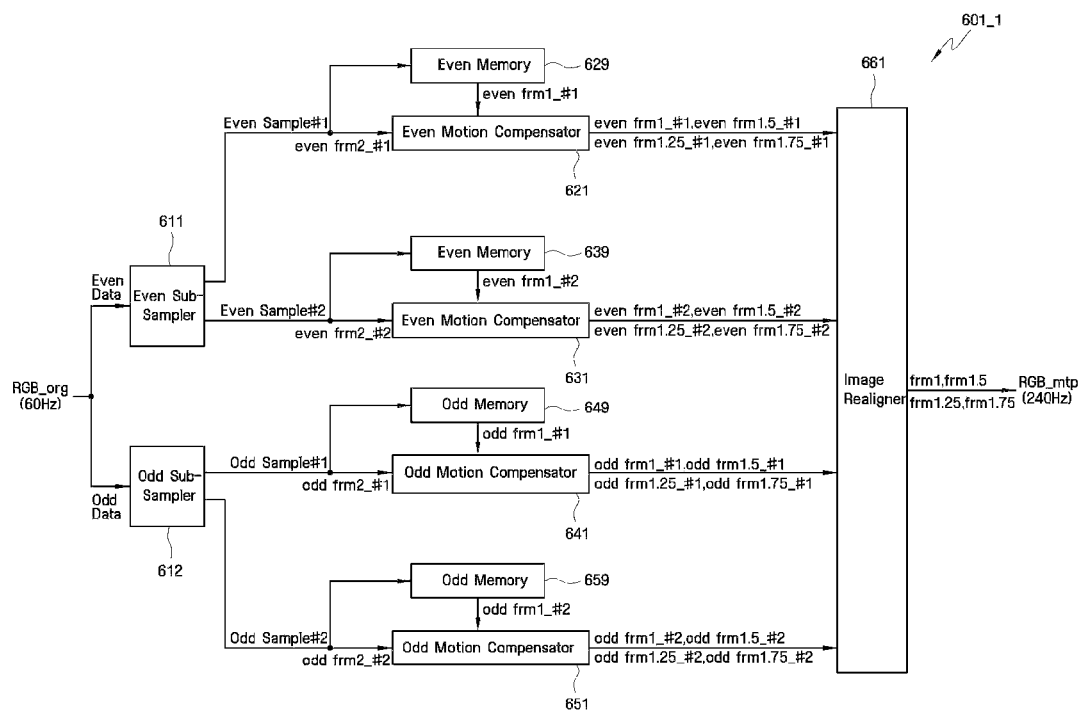
FIG. 10 is a block diagram of an alternative exemplary embodiment of an image signal processor included in a display device according to the present invention.
Figure 11:
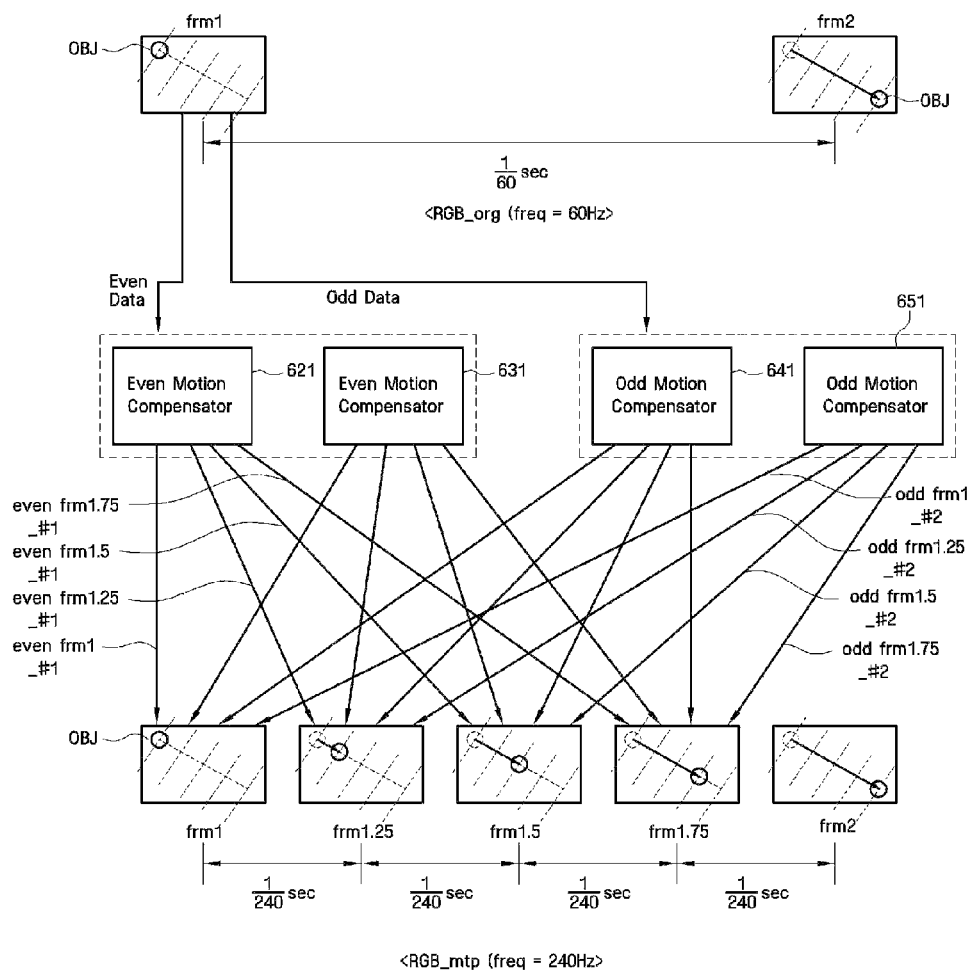
FIG. 11 is a block diagram for explaining a process in which the image signal processor shown in FIG. 10 outputs a high-speed image.

Hereinafter, a display device and a method of driving the same according to an alternative exemplary embodiment will be described in further detail with reference to FIGS. 10 and 11. FIG. 10 is a block diagram of an alternative exemplary embodiment an image signal processor 601_1 included in a display device 10 according to the present invention. FIG. 11 is a block diagram for explaining a process in which the image signal processor 601_1 shown in FIG. 10 outputs a high-speed image. For purposes of simplicity, elements substantially the same as those described in greater detail above are indicated by the same reference numerals, and an repetitive detailed description thereof will hereinafter be omitted.

In the display device 10 and the method of driving the same according to an exemplary embodiment, an original image signal RGB_org is divided into even data and odd data for sub-sampling and generating of a sub-interpolated image signal. The even data and the odd data may be inputted to different sub-samplers to be sub-sampled and, further, may be inputted to different motion compensators to produce sub-interpolated image signals. In an exemplary embodiment, the even data and the odd data may denote data alternately extracted from a series of data of the original image signal RGB_org. For example, when an original image signal RGB_org includes first through $n^{th}$ data, the first data may be odd data, the second data may be even data, and the third data may be odd data, for example. Thus, the series of data included in an original image signal RGB_org may be divided into the even data and the odd data.

Referring to FIG. 10, the image signal processor 601_1 included in the display device 10 according to an exemplary embodiment includes an even sub-sampler 611 and an odd sub-sampler 612, a motion interpolator (including a first even motion compensator 621 and a second even motion compensator 631, a first odd motion compensator 641 and a second odd motion compensator 651), a first even memory 629, a second even memory 639, a first odd memory 649 and a second odd memory 659, and an image realigner 661.

An original image RGB_org is divided into even data and odd data and is inputted accordingly to the even sub-sampler 611 and the odd sub-sampler 612. The even sub-sampler 611 sub-samples the even data and outputs k even sub-image signals. Even Sample#1 and Even Sample#2 into which the even data of the original image signal RGB_org is divided. The odd sub-sampler 612 sub-samples the odd data and outputs k odd sub-image signals Odd Sample#1 and Odd Sample#2 into which the odd data of the original image signal RGB_org is divided. In an exemplary embodiment, k is a natural number equal to or greater than two. More particularly, in the exemplary embodiment shown in FIG. 10, k is equal to two, and the original image signal RGB_org is thereby halved.

The first even motion compensator 621 and the second even motion compensator 631 are provided with the even sub-image signal Even Sample#1 or Even Sample#2 corresponding to 60 frames. Then, the first even motion compensator 621 and the second even motion compensator 631 generate and output even sub-interpolated image signals corresponding to three even sub-interpolated frames inserted between a current frame frm2 and a previous frame frm1 of the even sub-image signal Even Sample#1 or Even Sample#2. For example, the first even motion compensator 621 may generate and output even sub-interpolated image signals corresponding to even sub-interpolated frames even frm1.25_#1, even frm1.5_#1 and even frm1.75_#1, while the second even motion compensator 631 may generate and output even sub-interpolated image signals corresponding to even sub-interpolated frames even frm1.25_#2, even frm1.5_#2 and even frm1.75_#2.

More specifically, the first even motion compensator 621 may generate the even sub-interpolated image signals corresponding respectively to the even sub-interpolated frames even frm1.25_#1, even frm1.5_#1, and even frm1.75_#1 based on an even sub-image signal corresponding to an even sub-sample image even frm2_#1 of the current frame frm2 and an even sub-image signal corresponding to an even sub-sample image even frm1_#1 of the previous frame frm1. Accordingly, the first even motion compensator 621 outputs the even sub-image signal corresponding to the even sub-sample image even frm1_#1 of the previous frame frm1 and the even sub-interpolated image signals corresponding respectively to the even sub-interpolated frames even frm1.25_#1, even frm1.5_#1 and even frm1.75_#1.

To generate the even sub-interpolated image signals corresponding to the even sub-interpolated frames even frm1.25_#1, even frm1.5_#1 and even frm1.75_#1, the first even motion compensator 621 may assign different weights to a motion vector MV calculated by using the even sub-image signal corresponding to the even sub-sample image even frm2_#1 of the current frame frm2 and the even sub-image signal corresponding to the even sub-sample image even frm1_#1 of the previous frame frm1. More specifically, the first even motion compensator 621 may assign weights of ¼, ½ and ¾ to the motion vector MV so as to generate the ¼ even sub-interpolated frame even frm1.25__#1, the ½ even sub-interpolated frame even frm1.5__#1, and the ¾ even sub-interpolated frame even frm1.75__#1, respectively. The second even motion compensator 631 may also be described in substantially the same manner as the first even motion compensator 621, and any repetitive detailed description thereof has thereby been omitted.

The first odd motion compensator 641 and the second odd motion compensator 651 may be provided with the odd sub-image signal Odd Sample#1 or Odd Sample#2 corresponding to 60 frames. Then, the first odd motion compensator 641 and the second odd motion compensator 651 may generate and output odd sub-interpolated image signals corresponding to three odd sub-interpolated frames inserted between the current frame frm2 and the previous frame frm1 of the odd sub-image signal Odd Sample#1 or Odd Sample#2. For example, the first odd motion compensator 641 may generate and output odd sub-interpolated image signals corresponding to odd sub-interpolated frames odd frm1.25__#1, odd frm1.5__#1 and odd frm1.75__#1, whereas the second odd motion compensator 651 may generate and output odd sub-interpolated image signals corresponding to odd sub-interpolated frames odd frm1.25__#2, odd frm1.5__#2, and odd frm1.75__#2.

More specifically, the first odd motion compensator 641 may generate the odd sub-interpolated image signals corresponding to the odd sub-interpolated frames odd frm1.25__#1, odd frm1.5__#1 and odd frm1.75__#1 based on an odd sub-image signal corresponding to an odd sub-sample image odd frm2__#1 of the current frame frm2 and an odd sub-image signal corresponding to an odd sub-sample image odd frm1__#1 of the previous frame frm1. Accordingly, the first odd motion compensator 641 may output the odd sub-image signal corresponding to the odd sub-sample image odd frm1__#1 of the previous frame frm1 and the odd sub-interpolated image signals corresponding respectively to the odd sub-interpolated frames odd frm1.25__#1, odd frm1.5__#1, and odd frm1.75__#1. A description of the second odd motion compensator 651 is substantially the same as for the first odd motion compensator 641, and any repetitive detailed description thereof has thereby been omitted.

Still referring to FIG. 10, the image realigner 661 according to an exemplary embodiment realigns the even sub-interpolated image signals corresponding to the even sub-interpolated frames even frm1.25__#1, even frm1.5__#1, even frm1.75__#1, even frm1.25__#2, even frm1.5__#2 and even frm1.75__#2 and the odd sub-interpolated image signals corresponding to the odd sub-interpolated frames odd frm1.25__#1, odd frm1.5__#1, odd frm1.75__#1, odd frm1.25__#2, odd frm1.5__#2 and odd frm1.75__#2. Then, the image realigner 661 may output an interpolated image signal corresponding to a ¼ interpolated frame frm1.25, an interpolated image signal corresponding to a ½ interpolated frame frm1.5 and an interpolated image signal corresponding to a ¾ interpolated frame frm1.75. Additionally, the image realigner 661 may realign the sub-image signals corresponding to the even sub-sample images even frm1__#1 and even frm1__#2 and the odd sub-sample images odd frm1__#1 and odd frm1__#2 of the previous frame frm1 and output an image signal corresponding to the previous frame frm1.

Thus, the image realigner 661 may realign the even sub-interpolated image signal and the odd sub-interpolated image signal output from the first even motion compensator 621, the second even motion compensator 631, the first odd motion compensator 641 and the second odd motion compensator 651 and generate a high-speed, e.g., a quadruple-("4×")-speed, image signal RGB_mtp having three interpolated frames inserted between the previous frame frm1 and the current frame frm2. Thus, a 240 Hz image signal composed of 240 frames may be outputted and displayed on the display device 10 according to an exemplary embodiment.

Referring now to FIGS. 10 and 11, the original image signal RGB_org is divided into even data and odd data and provided accordingly to different motion compensators. As described above in further detail with reference to FIG. 10, the different motion compensators output the even sub-interpolated image signals corresponding to the even sub-interpolated frames even frm1.25__#1, even frm1.5__#1, even frm1.75__#1, even frm1.25__#2, even frm1.5__#2 and even frm1.75__#2 and the odd sub-interpolated image signals corresponding to the odd sub-interpolated frames odd frm1.25__#1, odd frm1.5__#1, odd frm1.75__#1, odd frm1.25__#2, odd frm1.5__#2 and odd frm1.75__#2. For purposes of simplicity, the even sub-interpolated image signals even frm1.25__#2, even frm1.5__#2 and even frm1.75__#2 output from the second even motion compensator 631 and the odd sub-interpolated image signals odd frm1.25__#1, odd frm1.5__#1, odd frm1.75__#1 output from the first odd motion compensator 641 are not specifically labeled in FIG. 11, but it will be understood that the image signals outputted from the second even motion compensator 631 and the first odd motion compensator 641 are similar to those of the first even motion compensator 621 and the second odd motion compensator 651, respectively, as illustrated in FIG. 11.

The image realigner 661 outputs the previous frame frm1 by realigning the even sub-image signal corresponding to the even sub-sample image even frm1__#1 provided by the first even motion compensator 621, the even sub-image signal corresponding to the even sub-sample image even frm1__#2 provided by the second even motion compensator 631, the odd sub-image signal corresponding to the odd sub-sample image odd frm1__#1 provided by the first odd motion compensator 641, and the odd sub-image signal corresponding to the odd sub-sample image even frm1__#2 provided by the second odd motion compensator 651.

The image realigner 661 may also output an interpolated image signal corresponding to an interpolated frame by using an even sub-interpolated image signal corresponding to an even sub-interpolated frame and an odd sub-interpolated image signal corresponding to an odd sub-interpolated frame.

More specifically, the image realigner 661 may output the ¼ interpolated frame frm1.25 by realigning the even sub-interpolated image signal corresponding to the even sub-interpolated frame even frm1.25__#1 provided by the first even motion compensator 621, the even sub-interpolated image signal corresponding to the even sub-interpolated frame even frm1.25__#2 provided by the second even motion compensator 631, the odd sub-interpolated image signal corresponding to the odd sub-interpolated frame odd frm1.25__#1 provided by the first odd motion compensator 641, and the odd sub-interpolated image signal corresponding to the odd sub-interpolated frame odd frm1.25__#2 provided by the second odd motion compensator 651. In similar ways, the ½ interpolated frame frm1.5 and the ¾ interpolated frame frm1.75 may be output. The outputting the interpolated frames is substantially the same as described in greater detail above with reference to FIGS. 8 and 9, and thus any repetitive detailed description thereof has been omitted.

As shown in FIG. 11, frames included in the high-speed (e.g., the 4×-speed) image signal RGB_mtp are outputted at intervals of ¹⁄₂₄₀ second. The high-speed image signal RGB_mtp has the ¼ interpolated frame frm1.25, the ½ interpolated frame frm1.5, and the ¾ interpolated frame frm1.75 inserted between the previous frame frm1 and the current frame frm2. More specifically, the ½ interpolated frame frm1.5 is inserted between the previous frame frm1 and the current frame frm2, the ¼ interpolated frame frm1.25 is inserted between the previous frame frm1 and the ½ interpolated frame frm1.5, and the ¾ interpolated frame frm1.75 is inserted between the ½ interpolated frame frm1.5 and the current frame frm2. By inserting the interpolated frames frm1.25, frm1.5 and frm1.75 between the previous and current frames frm1 and frm2, a display quality of the display device 10 according to an exemplary embodiment is substantially improved.

Thus, in a display device and a methods of driving the same according to exemplary embodiments, when data is divided into odd data and even data of the original image signal RGB_org and is further divided into k segments by a sub-sampler, an amount of data required to be processed by each motion compensator in substantially reduced, e.g., is cut in half, since the original image signal RGB_org is divided into two portions of data, e.g., the even data and the odd data, two motion compensators process the even data and the odd data.

Since the amount of data required to be processed is reduced in half, the motion compensators, each capable of processing an equal amount of data are used, each motion compensators outputs an image having three interpolated frames. Thus, a 240 Hz high-speed image can be output based on a 60 Hz original image signal RGB_org by using the motion compensators according to an exemplary embodiment described above with reference to FIGS. 10 and 11.

Accordingly, in the display device 10 and the method of driving the same according to an exemplary embodiment, the original image signal RGB_org is divided even data and odd data, which are processed accordingly. However, the present invention is not limited thereto. For example, the original image signal RGB_org can be divided into n pieces of data. In this case, while a 120 Hz high-speed image can be output based on the 60 Hz original image signal RGB_org in one exemplary embodiment, in an alternative exemplary embodiment, a 240 Hz high-speed image can be outputted based on the 60 Hz original image signal RGB_org.

Figure 12:
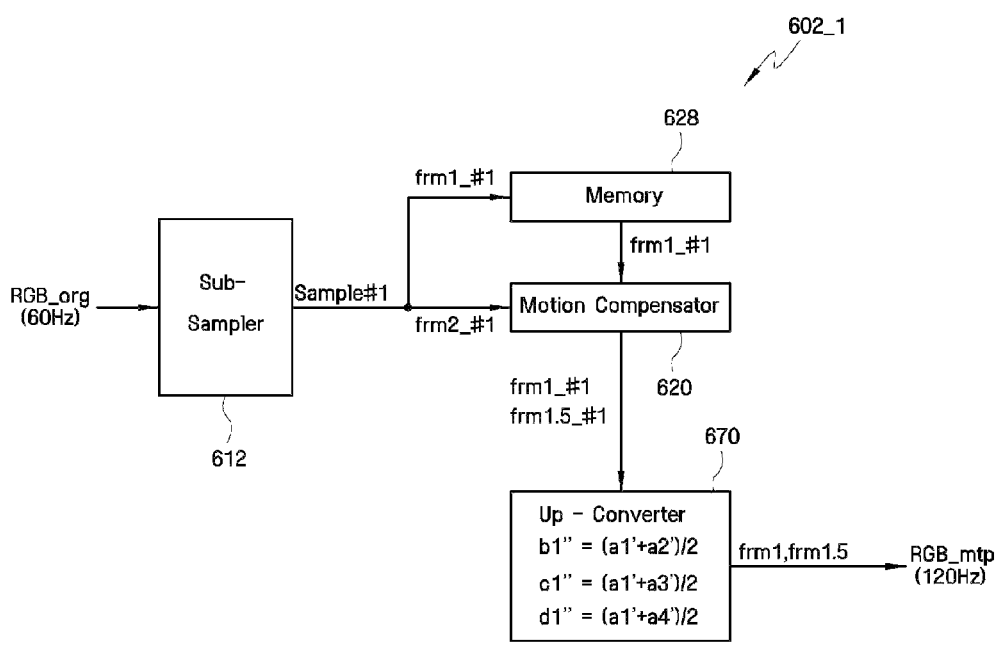
FIG. 12 is a block diagram of another alternative exemplary embodiment of an image signal processor included in a display device according to the present invention.
Figure 13:
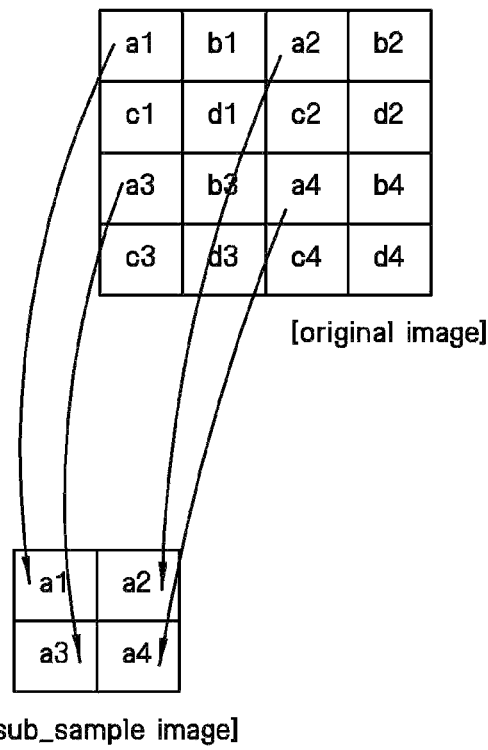
FIG. 13 is a diagram which illustrates a sub-sample image extracted by an exemplary embodiment of a sub-sampler of the image signal processor shown in FIG. 12 and an interpolated frame output from an up-converter thereof.

Hereinafter, a display device 10 and a method of driving the same according to another alternative exemplary embodiment will be described in further detail with reference to FIGS. 12 and 13. FIG. 12 is a block diagram of another alternative exemplary embodiment of an image signal processor 602_1 included in a display device according to the present invention. FIG. 13 is a diagram which illustrates a sub-sample image extracted by a sub-sampler 612 of the image signal processor shown in FIG. 12 and an interpolated frame output from an up-converter 670 thereof. For purposes of simplicity, elements which are substantially the same as those described in greater detail above are indicated by the same or like reference characters, and any repetitive detailed description thereof will hereinafter be omitted.

In the display device 10 and the method of driving the same according to an exemplary embodiment, sub-sampling and generating of a sub-interpolated image signal include extracting a sub-image signal by sub-sampling an original image signal RGB_org corresponding to any one of k groups of pixels PX (FIG. 1) (where k is a natural number greater than or equal to two) included in each display block and generating a sub-interpolated image signal from the extracted sub-image signal. In addition, the outputting of the interpolated image signal includes generating an image signal corresponding to each un-sampled pixel of the k groups of pixels by using the generated sub-interpolated image signal and outputting an interpolated image signal.

Referring to FIG. 12, the image signal processor 602_1 included in the display device 10 (FIG. 1) according to an exemplary embodiment includes the sub-sampler 612, a motion interpolator, a memory 628 and the up-converter 670.

The sub-sampler 612 may sub-sample an original image signal RGB_org and output any one of k sub image signals (e.g., Sample#1) into which the original image signal RGB_org is divided. In an exemplary embodiment shown in FIG. 13, for example, the original image signal RGB_org is divided into four sub-image signals (e.g., k=4). Thus, the sub-image signal Sample#1 is any one of the sub image signals into which the original image signal RGB_org is divided. Accordingly, a sub-image signal can be extracted by sub-sampling an original image signal RGB_org corresponding to any one of k pixels included in each of the display blocks.

The sub-sampling of the original image signal RGB_org may further include selecting a group of pixels PX (FIGS. 1 and 2) from each display block based on a specified rule and sampling the original image signal RGB_org corresponding to the selected group of pixels PX. Specifically, as shown in FIG. 13, a group of pixels PX at a top left corner of each display block may be selected, and then the original image signal RGB_org corresponding to the selected group of pixels PX may be sampled.

The motion interpolator may generate a sub-interpolated image signal corresponding to a sub-interpolated frame frm1.5_#1 from the sub-sampled sub-image signal Sample#1. As illustrated in FIG. 12, the motion interpolator may include a single motion compensator 620 (e.g., an image interpolation chip), but alternative exemplary embodiments are not limited thereto. In addition, the motion compensator 620 may be configured to process an image signal corresponding to an image having a resolution equal to $1/k^{th}$ of a resolution of a display panel 300 (FIG. 1).

The motion compensator 620 may be provided with sub-image signals corresponding to a current frame frm2 and a previous frame frm1. More specifically, the motion compensator 620 may receive a sub-image signal corresponding to a sub-sample image frm2_#1 of the current frame frm2 from the sub-sampler 612 and read a sub-image signal corresponding to a sub-sample image frm1_#1 of the previous frame frm1 from the memory 628. Thus, the motion compensator 620 may receive the sub-image signal Sample#1 corresponding to 60 frames and generate and output the sub-image signal corresponding to the sub-sample image frm1_#1 of the previous frame frm1 and the sub-interpolated image signal corresponding to the sub-interpolated frame frm1.5_#1 inserted between the current frame frm2 and the previous frame frm1.

The up-converter 670 performs super resolution or up-conversion. More specifically, super resolution or up-conversion includes a technique of generating an image with a relatively higher resolution by using input image information with a relatively lower resolution. The up-converter 670 may generate an interpolated image signal corresponding to each un-sampled pixel by using a generated sub-interpolated image signal.

In an interpolated frame illustrated in FIG. 13, for example, interpolated image signals b1, b2, c1, c2, d1, and d2 correspond to un-sampled groups of pixels PX. To generate interpolated image signals corresponding to the un-sampled groups of pixels PX, sub-interpolated image signals are interpolated. For example, as illustrated in FIG. 12, the interpolated image signal b1" may be generated as an average of sub-interpolated image signals a1' and a2', the interpolated image signal c1" may be generated as the average of sub-interpolated image signals a1' and a3' and the interpolated image signal d1" may be generated as the average of sub-interpolated image signals a1' and a4'. However, alternative exemplary embodiments are not limited thereto. For example, various algorithms used in super resolution and/or up-conversion may be utilized depending upon a resolution of the display device 10 and/or what the display device 10 is used for.

The image signal processor 602_1 according to an exemplary embodiment may further include an image realigner (FIGS. 4 and 10). The image realigner may realign and output a generated sub-interpolated image signal and an interpolated image signal corresponding to each un-sampled group of pixels PX, so that the realigned and output image signals correspond to an interpolated image, as illustrated in FIG. 13.

Thus, in a display device and method of driving the same according to an exemplary embodiment, a high-speed image is outputted using a single motion compensator capable of processing an image signal corresponding to an image having a resolution equal to $1/k^{th}$ of a resolution of a display panel. Specifically, as described in greater detail above, a sub-sample image has data which is $1/k^{th}$ of that of an original image signal RGB_org corresponding to an original image. Accordingly, a motion compensator is only required to process an image signal corresponding to an image whose resolution is $1/k^{th}$ of the resolution of a display panel. Since a high-speed image can be output by using a motion compensator capable of processing data which is $1/k^{th}$ of that of the original image signal RGB_org, a display quality of the display device is substantially improved, and manufacturing costs thereof are substantially reduced.

Figure 14:
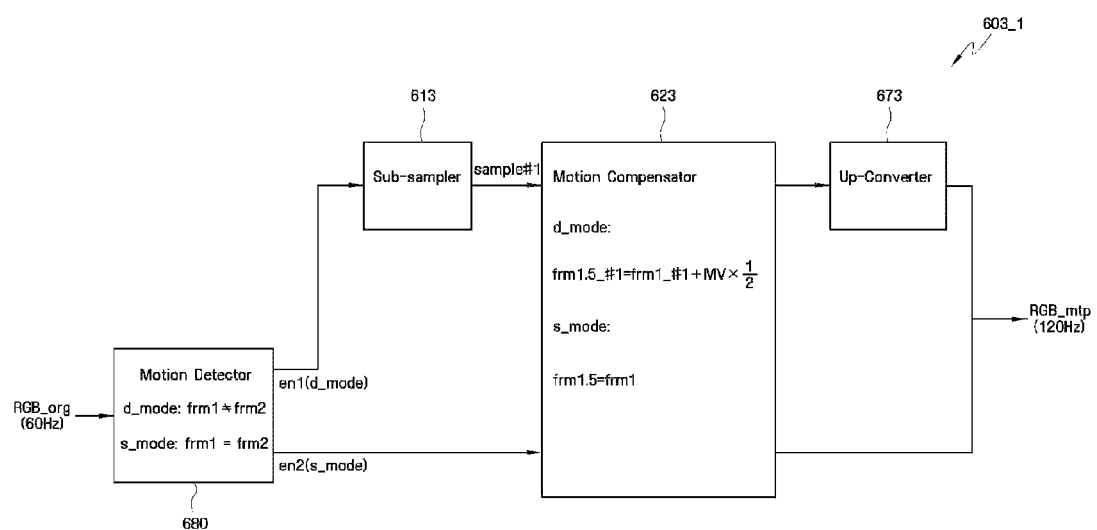
FIG. 14 is a block diagram of yet another alternative exemplary embodiment of an image signal processor included in a display device according to the present invention.
Figure 15:
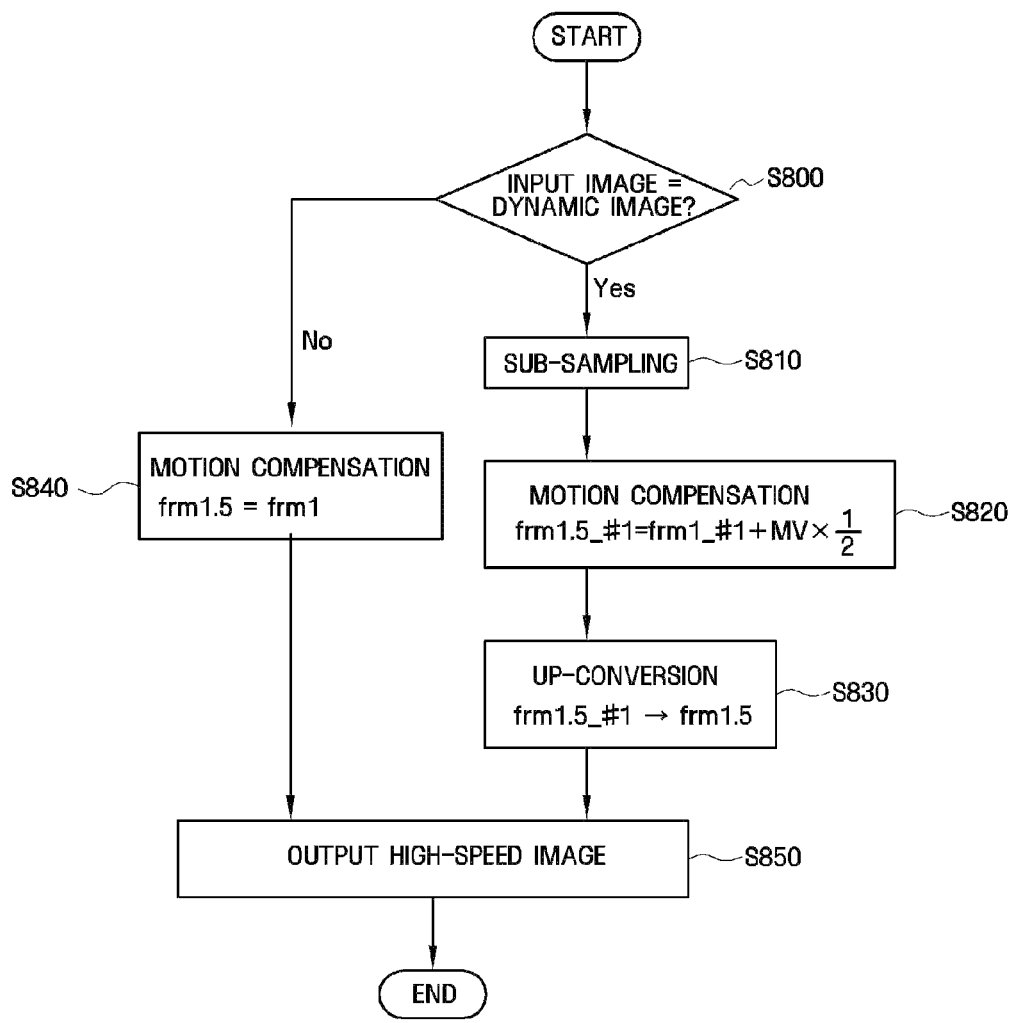
FIG. 15 is a flowchart illustrating an exemplary embodiment of a method of driving a display device according to the present invention.

Hereinafter, a display device 10 and a method of driving the same according to yet another alternative exemplary embodiment will be described in further detail with reference to FIGS. 14 and 15. FIG. 14 is a block diagram of yet another alternative exemplary embodiment of an image signal processor 603_1 included in a display device according to the present invention. FIG. 15 is a flowchart illustrating an exemplary embodiment of a method of driving a display device according to the present invention. For simplicity, components which are substantially the same as those described in greater detail above are indicated by the same or like reference characters, and thus any repetitive detailed description thereof will hereinafter be omitted.

In the display device 10 and the method of driving the same according to an exemplary embodiment, the display device 10 operates differently depending on whether two successive frames of an original image signal RGB_org are dynamic or static.

More specifically, when two successive frames of an original image signal RGB_org are dynamic, the image signal processor 603_1 included in the display device 10 according to an exemplary embodiment performs sub-sampling, generates a sub-interpolated image signal, and realigns the sub-interpolated image signal on the two successive frames. On the other hand, when the two successive frames of the original image signal RGB_org are static, an original image signal RGB_org corresponding to a previous frame frm1 is used as an interpolated image signal for the two successive frames.

Referring to FIG. 14, the image signal processor 603_1 includes a motion detector 680, a sub-sampler 613, a motion compensator 623, a memory (FIG. 12) and an up-converter 673.

The motion detector 680 compares two successive frames (e.g., a previous frame frm1 and a current frame frm2) of the original image signal RGB_org and determines whether the two successive frames are dynamic or static. More particularly, when the previous frame frm1 and the current frame frm2 are different, they may be determined to be dynamic. When the previous frame frm1 and the current frame frm2 are substantially the same, however, they may be determined to be static. Based on the determination, the motion detector 680 outputs either a control signal en1(d_mode) for operating the image signal processor 603_1 in a dynamic mode d_mode or a control signal en2(s_mode) for operating the image signal processor 603_1 in a static mode s_mode.

The control signal en1(d_mode) activates the sub-sampler 613 to extract a sub-image signal corresponding to a sub-sample image sample#1. In addition, the control signal en1(d_mode) causes the motion compensator 623 to operate in the dynamic mode d_mode and activates the up-converter 673 to output an interpolated image signal based on the sub-interpolated image signal generated by the motion compensator 623. When the motion compensator 623 is in the dynamic mode d_mode, an image signal obtained by adding a motion vector MV assigned a weight of ½, for example, to an image signal of a sub-sample image frm1_#1 corresponding to the previous frame frm1 may be outputted as an image signal of a sub-interpolated frame frm1.5_#1 of an interpolated frame. The function and operation of the sub-sampler 613 and the up-converter 673 are substantially the same as those of the sub-sampler 612 and the up-converter 670 described in further detail above, and thus any repetitive detailed description thereof will hereinafter be omitted.

The control signal en2(s_mode) deactivates the sub-sampler 613 and the up-converter 673 and causes the motion compensator 623 to operate in the static mode s_mode. When the motion compensator 623 is operating in the static mode s_mode, an image signal of the previous frame frm1 is used as an image signal of an interpolated frame frm1.5.

FIG. 15 is a flowchart illustrating an exemplary embodiment of a method of driving the display device according to the present invention.

Referring to FIG. 15, it is determined whether an input image is a dynamic image or a static image (operation S800). When it is determined that the input image is the dynamic image, the input image is sub-sampled to produce a sub-image signal, as described above (operation S810).

A sub-interpolated image signal is generated from the sub-image signal (operation S820). The sub-interpolated image signal is up-converted to generate an interpolated image signal (operation S830). A high-speed image signal having an interpolated frame corresponding to the generated interpolated image signal is outputted (operation S850).

Alternatively, when it is determined that the input is a static image, an image signal corresponding to a previous frame frm1 is used as an image signal of an interpolated frame (operation S840). Then, a high-speed image signal having the interpolated frame, which is the image signal corresponding to the previous frame frm1, is outputted (operation S850).

In contrast, in an alternative exemplary embodiment of a display device and a method of driving the same, determining whether an input image is a dynamic image or a static image is performed after sub-sampling, generating of a sub-interpolated frame, and up-conversion of the sub-interpolated frame. For example, an interpolated frame may be generated after the generating the sub-interpolated frame and the up-conversion of the sub-interpolated frame. Then, it may be determined whether two successive frames of an original image signal RGB_org are dynamic or static. If it is determined that the two successive frames of the original image signal RGB_org are dynamic, the interpolated frame may be inserted. If it is determined that the two successive frames of the original image signal RGB_org are static, a previous frame frm1 may be inserted instead of the interpolated frame.

Thus, in an alternative exemplary embodiment it is determined whether two successive frames of an original image signal RGB_org are dynamic, and then an interpolated frame is obtained by performing the generating of a sub-interpolated frame and super resolution is inserted only when the image is a dynamic image.

Thus, in the display device and the method of driving the same according to an exemplary embodiment, since an interpolated frame is obtained by performing the generating of a sub-interpolated frame and super resolution only on a dynamic image, a probability that a display quality of the display device will deteriorate due to generating of a sub-interpolated frame and super resolution performed on a static image is substantially reduced.

It will be noted that, the foregoing description of an alternative exemplary embodiment may also be applied to the exemplary embodiments described in greater detail above with reference to FIGS. 1-13. Thus, in alternative exemplary embodiments, it may also be determined whether two successive frames of an original image signal RGB_org are dynamic or static. Then, if the two successive frames of the original image signal RGB_org are determined to be dynamic, sub-sampling, generating of a sub-interpolated image signal, and realigning of a sub-interpolated image signal may be performed on the two successive frames. If the two successive frames of the original image signal RGB_org are determined to be static, on the other hand, an original image signal RGB_org corresponding to a previous frame frm1 may be used as an interpolated image signal for the two successive frames.

The present invention should not be construed as being limited to the exemplary embodiments set forth herein. Rather, these exemplary embodiments are provided so that this disclosure will be thorough and complete and will fully convey the concept of the present invention to those skilled in the art While the present invention has been particularly shown and described with reference to exemplary embodiments thereof, it will be understood by those of ordinary skill in the art that the exemplary embodiments should be considered in a descriptive sense only and not for purposes of limitation and that various changes in form and detail may be made therein without departing from the spirit or scope of the present invention as defined by the following claims.

What is claimed is:

1. A method of driving a display device, the method comprising:
   sub-sampling an original image signal;
   generating a sub-image signal;
   generating a sub-interpolated image signal from the sub-image signal;
   generating an interpolated image signal by realigning the sub-interpolated image signal; and
   displaying a display image based on the interpolated image signal,
   wherein the sub-sampling the original image signal and the generating the sub-interpolated image signal are performed by dividing the original image signal into even data and odd data, and
   wherein the even data and the odd data are inputted to different image interpolation chips of the k image interpolation chips to generate the sub-interpolated image signal.

2. A method of driving a display device, the method comprising:
   sub-sampling an original image signal;
   generating a sub-image signal;
   generating a sub-interpolated image signal from the sub-image signal;
   generating an interpolated image signal by realigning the sub-interpolated image signal; and
   displaying a display image based on the interpolated image signal,
   wherein when two successive frames of the original image signal are dynamic, the sub-sampling the original image signal, the generating the sub-interpolated image signal and the generating the interpolated image signal by realigning the sub-interpolated image signal are performed on the two dynamic successive frames.

3. A method of driving a display device, the method comprising:
   sub-sampling an original image signal;
   generating a sub-image signal;
   generating a sub-interpolated image signal from the sub-image signal;
   generating an interpolated image signal by realigning the sub-interpolated image signal; and
   displaying a display image based on the interpolated image signal,
   wherein when two successive frames of the original image signal are static, the original image signal corresponding to a previous frame of the two successive frames is used as the interpolated image signal for the two static successive frames.

4. A method of driving a display device including a display panel having display blocks, each of the display blocks including k groups of pixels, the method comprising:
   sub-sampling an original image signal which corresponds to one group of the k groups of pixels included in one of the display blocks;
   extracting a sub-image signal from the original image signal which is sub-sampled;
   generating a sub-interpolated image signal from the sub-image signal;
   generating an interpolated image signal corresponding to unsampled pixels of the k groups of pixels included in the one of the display blocks using the sub-interpolated image signal;
   generating an interpolated frame based on the interpolated image signal; and
   displaying a display image having the interpolated frame, wherein
   the display image is displayed on the display panel,
   the sub-image signal corresponds to a sub-sample image,
   the sub-sample image includes images, each sampled from k images into which a portion of the display image, displayed on display blocks, and
   k is a natural number greater than or equal to two.

5. The method of claim 4, wherein when two successive frames of the original image signal are dynamic, the sub-sampling the original image signal, the generating the sub-interpolated image signal and generating an interpolated image signal are performed on the two dynamic successive frames.

6. The method of claim 4, wherein when two successive frames of the original image signal are static, the original image signal corresponding to a previous frame of the two successive frames is used as the interpolated image signal for the two static successive frames.

7. A display device comprising:
   a sub-sampler which sub-samples an original image signal and generates a sub-image signal;
   a motion interpolator which generates a sub-interpolated image signal from the sub-image signal;

an image realigner which realigns the sub-interpolated image signal and outputs an interpolated image signal; and a display panel which displays a display image having an interpolated frame corresponding to the interpolated image signal, wherein the sub-sampler sub-samples the original image and the motion interpolator generates the sub-interpolated image signal by dividing the original image signal into even data and odd data.

8. A display device comprising:

a sub-sampler which sub-samples an original image signal and generates a sub-image signal;

a motion interpolator which generates a sub-interpolated image signal from the sub-image signal;

an image realigner which realigns the sub-interpolated image signal and outputs an interpolated image signal; and a display panel which displays a display image having an interpolated frame corresponding to the interpolated image signal, wherein the display panel comprises display blocks each including k groups of pixels, and k is a natural number greater than or equal to two; and the display device further comprises an up-converter which generates the interpolated image signal corresponding to unsampled groups of pixels of the k groups pixels by using the sub-interpolated image signal generated from the sub-image signal, wherein the sub-sampler sub-samples the original image signal, which corresponds to one group of the k groups of pixels included a corresponding display block of the display panel, and extracts the sub-image signal, and the image realigner realigns the sub-interpolated image generated from the sub-image signal and the interpolated image signal corresponding to unsampled groups of pixels of the k groups of pixels.

* * * * *